United States Patent
Abram et al.

(10) Patent No.: US 12,065,012 B2
(45) Date of Patent: Aug. 20, 2024

(54) CHASSIS LINK

(71) Applicant: BENTELER AUTOMOBILTECHNIK GMBH, Paderborn (DE)

(72) Inventors: Thomas Abram, Paderborn (DE); Olga Kasper, Paderborn (DE); Stephan Meyer, Bielefeld (DE); Vojtech Drtina, Liberec (CZ)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 0 days.

(21) Appl. No.: 18/113,255

(22) Filed: Feb. 23, 2023

(65) Prior Publication Data
US 2023/0264533 A1    Aug. 24, 2023

(30) Foreign Application Priority Data
Feb. 24, 2022 (DE) .................... 10 2022 104 477.7

(51) Int. Cl.
*B60G 7/00*    (2006.01)

(52) U.S. Cl.
CPC ............. *B60G 7/001* (2013.01); *B60G 7/005* (2013.01); *B60G 2206/124* (2013.01)

(58) Field of Classification Search
CPC ... B60G 7/001; B60G 7/005; B60G 2206/124
See application file for complete search history.

(56) References Cited

U.S. PATENT DOCUMENTS

| | | | |
|---|---|---|---|
| 8,439,590 B2 * | 5/2013 | Garcia | F16C 17/243 403/23 |
| 9,789,743 B2 * | 10/2017 | Donkai | B60G 7/005 |
| 2003/0034625 A1 | 2/2003 | Runte et al. | |
| 2012/0098228 A1 | 4/2012 | Wilson et al. | |
| 2016/0243911 A1 | 8/2016 | Wohlers et al. | |
| 2021/0053408 A1 | 2/2021 | Meyer et al. | |
| 2021/0197637 A1 | 7/2021 | Hoschouer et al. | |

FOREIGN PATENT DOCUMENTS

| | | |
|---|---|---|
| DE | 10140288 C1 | 8/2002 |
| DE | 102004042964 A1 | 3/2006 |
| DE | 102011116298 A1 | 4/2012 |
| DE | 102013221893 A1 | 4/2015 |
| DE | 102016201457 A1 | 8/2017 |
| DE | 102016220165 A1 | 4/2018 |
| DE | 102018210913 A1 | 1/2020 |

(Continued)

OTHER PUBLICATIONS

Office Action for German Application No. 10 2022 104 477.7 mailed Oct. 27, 2022; 14pp.

*Primary Examiner* — Faye M Fleming
(74) *Attorney, Agent, or Firm* — HAUPTMAN HAM, LLP

(57) ABSTRACT

A chassis link has a link body, a ball joint socket being arranged at one link end of the link body. The ball joint socket has a cylindrical portion and an outwardly directed flange which is formed from the same material as and in one piece with the cylindrical portion. The ball joint socket is joined by way of the flange to a first web of the link body. A second lower web of the link body is joined to the cylindrical portion.

15 Claims, 4 Drawing Sheets

(56) References Cited

FOREIGN PATENT DOCUMENTS

| DE | 102019122721 A1 | | 2/2021 | |
|----|----|----|----|----|
| DE | 112019004182 T5 | | 6/2021 | |
| KR | 101613470 B1 | | 4/2016 | |
| WO | WO-2016087732 A1 | * | 6/2016 | ............. B60G 7/005 |
| WO | 2021133146 A1 | | 7/2021 | |

* cited by examiner

CHASSIS LINK

RELATED APPLICATIONS

The present application claims priority of German Application Number 10 2022 104 477.7 filed Feb. 24, 2022, the disclosure of which is hereby incorporated by reference herein in its entirety.

FIELD

The disclosure relates to a chassis link.

BACKGROUND

Chassis links belong to the wheel suspension system of a motor vehicle and absorb dynamic driving forces. The absorbed forces are damped and the driving comfort is increased by way of the mounting system. The chassis links assume both wheel control tasks and the transmission of suspension, damping and stabilization forces.

A distinction is made between guide links, supporting links and auxiliary links depending on their function. Guide links assume the control of the wheel without supporting the vehicle weight. Mainly axial forces are introduced at the joints of the guide links. Supporting links absorb radial forces such as brake and drive forces. In addition, they support the weight of the vehicle together with other chassis components. Supporting links have additional force introduction points for suspension and damper forces. Auxiliary links have the function of connecting the guide and supporting links among one another or also of connecting them to the wheel support in the case of specific axle constructions.

Chassis links are also differentiated in accordance with the number of their attachment points. Two-point links, three-point links or four-point links are used depending on the structural requirements. The two-point link is a chassis link that has in each case one ball joint and one rubber bearing or two rubber bearings or hydromounts. Three-point bearings have a ball joint and two bearings.

Links are also differentiated into transverse links, longitudinal links or composite links in accordance with the installation direction. Transverse links are positioned transversely with respect to the wheel plane. Longitudinal links are positioned in the driving direction. A composite link is two longitudinal links which are connected to a crossmember.

A transverse link is viewable in WO 2021/133 146 A1. The transverse link has a triangular or boomerang-like link body. A socket for a ball joint is provided on length portion on the end side.

A transverse link of shell design made from two stamped metal shells is viewable in DE 11 2019 004 182 T5. DE 10 2016 220 165 A1 also describes a transverse link of shell design.

A chassis link with a main body made from an extruded hollow profile with a plurality of hollow chambers is described by DE 10 2019 122 721 A1.

A joint component is described in DE 10 2018 210 913 A1. The joint component is able to form a three-point link and comprises a joint in the form of a ball joint and two rubber bearings. The joint housing and the component body of the joint component are connected to one another by way of a plug-and-turn fastener.

A chassis link in the form of a transverse link of double shell/sheet metal configuration is described in DE 101 40 288 C1, and has a link body, a ball joint socket being arranged at one link end of the link body. The ball joint socket has a cylindrical portion and, made from the same material as and in one piece with the cylindrical portion, an outwardly directed flange. The flange is joined to a first web of the link body.

A hinged support made from an extruded profile is described in DE 10 2004 042 964 A1.

DE 10 2013 221 893 A1 concerns a method for producing a link and a multiple-point link for a motor vehicle.

A stamped transverse link is described in DE 10 2011 116 298 A1.

DE 10 2016 201 457 A1 describes a method for producing a suspension link, and KR 10 1 613 470 B1 describes a chassis link.

Sockets for ball joints are welded on as bushings, or are riveted or screwed onto the link in the form of separate components, for example as a forged component. These embodiments do not provide the best prerequisites both with regard to rigidity and service life. If there are unfavorable installation conditions, able to occur in the case of a welded-in bushing socket as a result of boundary conditions such as welding protrusion or welding torch freedom of movement that the welded seam which connects the bushing or the socket component to the shells is loaded with bending torques. As a result, the rigidities and the service life of the link are decreased. These problems are able to arise in the case of different fasteners such as rivets or screws.

SUMMARY

The present disclosure provides a chassis link which is improved with regard to rigidity behavior and service life and in the case of which, the transmission of the wheel forces from the wheel support to a front link via the ball joint is improved.

A chassis link has a link body with a link end, on which a ball joint socket is arranged. The ball joint socket has a cylindrical portion and, formed from the same material as and in one piece with the cylindrical portion, an outwardly directed flange. The flange is joined to a first web of the link body.

The ball joint socket is formed by way of a flanged bushing, the cylindrical portion being configured as an eyelet with the outwardly directed collar-shaped flange. The flange is of circumferential configuration.

The ball joint socket is welded on at a free link end of the link body. The ball joint socket is configured and intended to receive a ball joint. The cylindrical portion forms the bearing seat for the ball joint.

The present disclosure provides that the flange has two flange portions which have a width which is different than one another. The wider annular section-shaped flange portion is joined to the first web.

A second web of the link body is joined to the cylindrical portion. In relation to the installed position of the chassis link, the first web is situated above the second web. There is a spacing vertically between the upper first web and the lower second web. The first web lies horizontally in full-area contact with the flange portion of the flange and is joined to the latter. The lower second web reaches around the circumferential region of the cylindrical portion and is joined to the latter.

The link body has length portions which have a height and width in the vertical cross section, the width being dimensioned to be greater than the height. The cross-sectional specification just like the height and the width of a length portion relate in each case to the installed position of the chassis link. The first web of the chassis link lies at a spacing above the second web. The ball joint socket is joined to the upper first web of the link body. The spacing from the lower second web of the link body is able to vary. The geometrical moment of inertia in the length portion of the chassis link and the rigidity and the torsional behavior of the chassis link is able to be set via the setting of the spacing between the upper first web and the lower second web.

The upper first web of the link body has an upper side and a lower side in relation to the installed position of the chassis link. The flange of the ball joint socket bears against the lower side of the first web and is joined from above to the first web, and is welded from above.

The ball joint socket is joined to the second lower web, and is welded. Here, the second web reaches around the cylindrical portion on a circumferential portion, and is joined from below to the cylindrical portion, and is welded.

The flange of the ball joint socket and the upper first web are joined by way of a first welded seam, the upper welded seam. The cylindrical portion and the lower second web are joined by way of a second welded seam, the lower welded seam. The upper welded seam and the lower welded seam are spaced apart from one another vertically. In addition, the upper welded seam and the vertical welded seam are offset with respect to one another in the transverse plane of the link end in relation to the center axis which extends through the cylinder sleeve. The upper welded seam has a greater spacing radially from the center axis than the lower welded seam.

The welded seams is able to be relieved of dynamic and static forces and torques by way of the joining according to some embodiments of the present disclosure and the welded seam position. The chassis link according to some embodiments of the present disclosure has an improved rigidity behavior. The configuration according to some embodiments of the present disclosure also leads to a considerable increase in the service life. The transmission of wheel forces from a wheel support to a front link via the ball joint is improved by way of the configuration and arrangement of the ball joint socket.

In some embodiments of the present disclosure the first web and the second web each have an arcuate joining portion. The first web makes contact by way of its arcuate joining portion with the flange of the ball joint socket and lies on the latter. The welded seam is guided from above.

The second web butts with its arcuate joining portion in the circumferential side against the cylindrical portion of the ball joint socket and is joined to the latter.

The rigidity and service life of a chassis link is able to be increased by way of the configuration according to the present disclosure of the ball joint socket as an eyelet with a cylindrical portion and an outwardly directed single-piece flange made from a uniform material, and the joining position is provided according to the present disclosure between the ball joint socket and the link body. In addition, the geometry of the link body, such as the length portion with the first link end, is able to be adapted individually to installation-space and structural requirements.

The link body is able to be formed from a sheet metal shell. In the case of a single-shell link body which is formed from a sheet metal shell, the ball joint socket is joined by way of its flange on the upper side and on the lower side to a first web of the link body and the sheet metal shell.

The configuration of the sheet metal shell of a single-shell link body also is able to be embodied in such a way that one sheet metal shell is formed in such a way that the sheet metal shell has a first upper web and a second lower web, the flange being joined to the first web of the link body and the second web of the link body being joined to the cylindrical portion.

In at least one embodiment, the link body is configured at least in sections as a hollow profile. The link body is configured as a hollow profile at least in the length portion which supports the ball joint socket on the end side.

The link body is assembled from sheet metal shells. The link body is formed from two sheet metal shells. Each sheet metal shell has a web and in each case one limb on the edge side. The two sheet metal shells are assembled to form the link body, and are joined to or along the limb which makes contact with them. The sheet metal shells form a hollow profile. The first web is a constituent part of the upper sheet metal shell of the link body. The second web is a constituent part of the lower sheet metal shell of the link body.

In the case of a link body which is formed from at least one sheet metal shell, the one sheet metal shell or the plurality of sheet metal shells, two sheet metal shells, consists of steel. In the case of a link body which is configured in one piece as a hollow profile, the link body or the hollow profile consists, for example, of a light metal or a light metal alloy, for example, aluminum or an aluminum alloy.

BRIEF DESCRIPTION OF THE DRAWINGS

In the following text, the some embodiments of the present disclosure are described below on the basis of drawings, in which.

DETAILED DESCRIPTION

Figure 1:
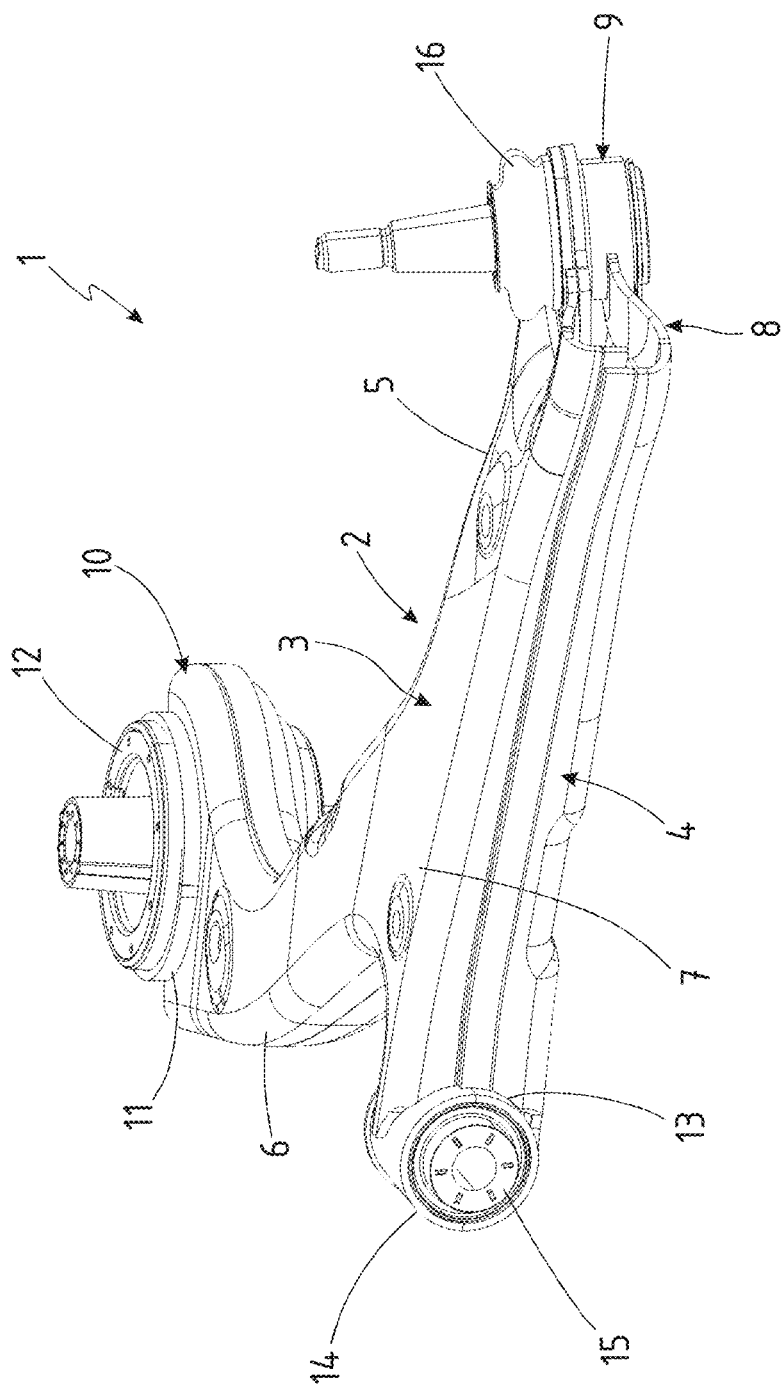
FIG. 1 shows a chassis link in a perspective view according to at least one embodiment of the disclosure.

FIG. 1 shows a chassis link 1 in the form of a three-point transverse link.

FIG. 2 to FIG. 7 show parts and part components of the chassis link 1.

The chassis link 1 has a link body 2 which is assembled from two sheet metal shells 3, 4. The sheet metal shells 3, 4 are formed using press technology.

The link body 2 has a first length portion 5 and a second length portion 6, and a connecting portion 7 which is situated between the length portions 5, 6.

A ball joint socket 9 is arranged at the free link end 8 of the first length portion 5 of the link body 2. A bearing seat 11 which receives a bearing component 12 is provided at the link end 10 of the second length portion 6. A projection which forms a positional attachment 13 at its free end is configured on the outer circumference of the connecting portion 7. A bushing 14 for a rubber bearing 15 is joined here.

Figure 2:
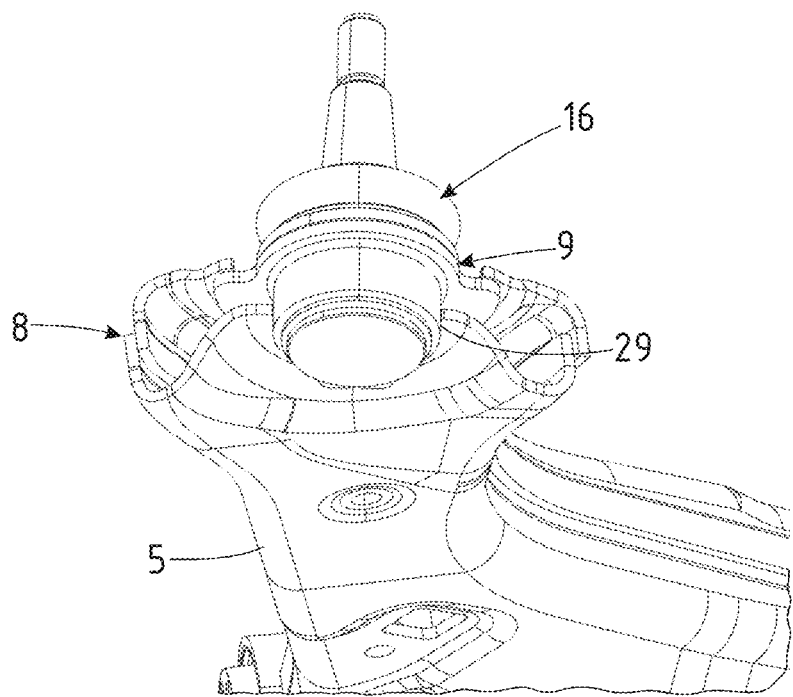
FIG. 2 shows a perspective view of a link arm with an end-side ball joint socket and an integrated ball joint according to at least one embodiment of the disclosure.
Figure 3:
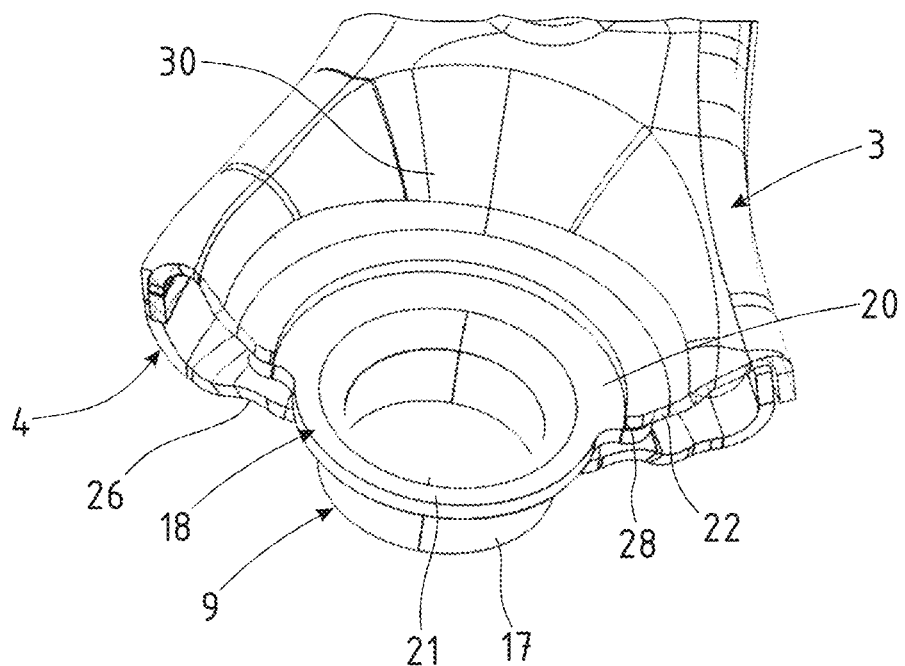
FIG. 3 shows a view of the ball joint socket obliquely from above according to at least one embodiment of the disclosure.
Figure 4:
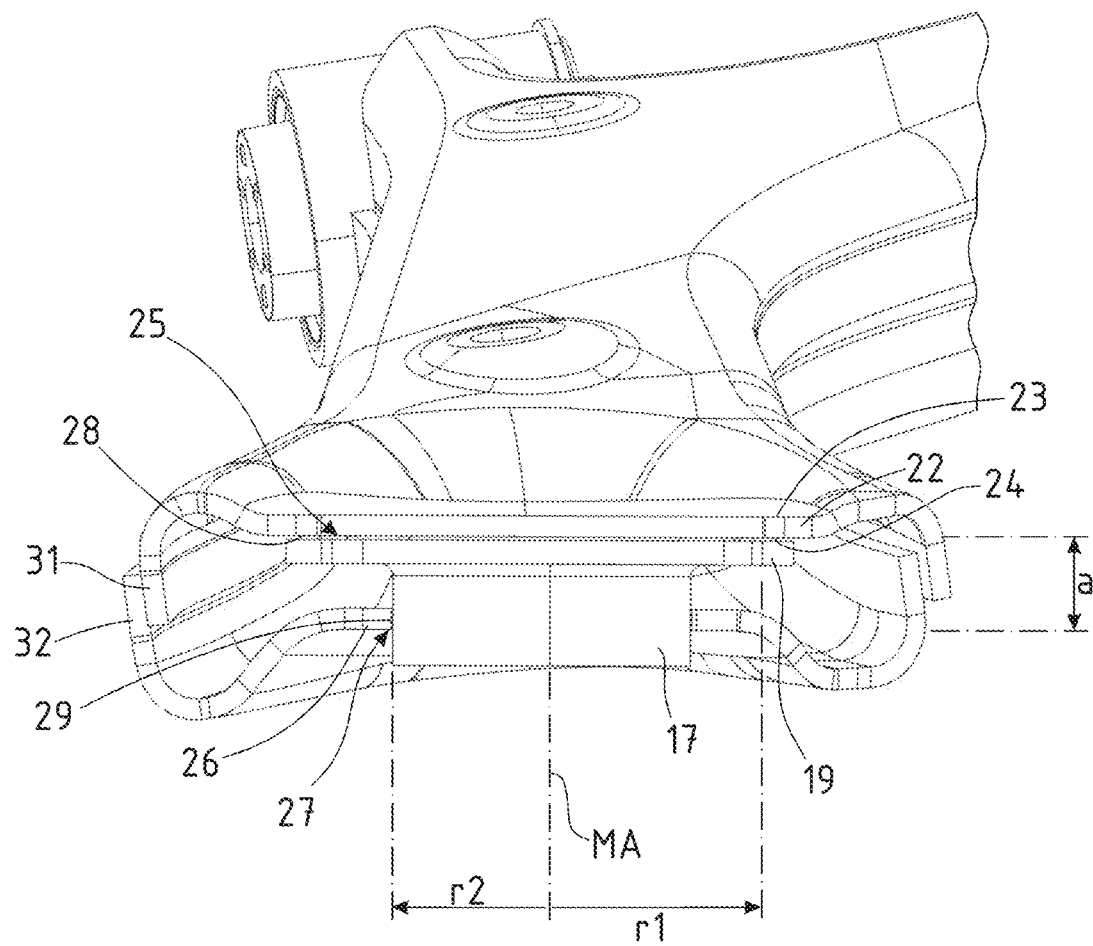
FIG. 4 shows an end view of the link end with the ball joint receptacle according to at least one embodiment of the disclosure.
Figure 5:
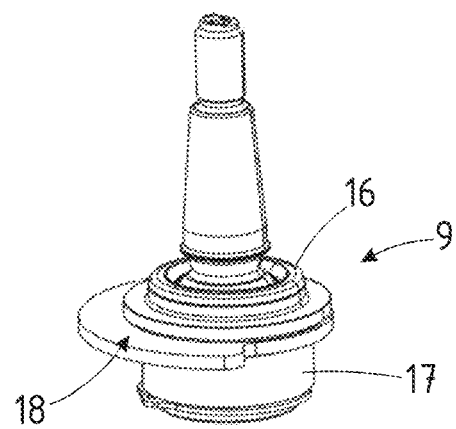
FIG. 5 shows a view of a ball joint socket with a received ball joint according to at least one embodiment of the disclosure.
Figure 6:
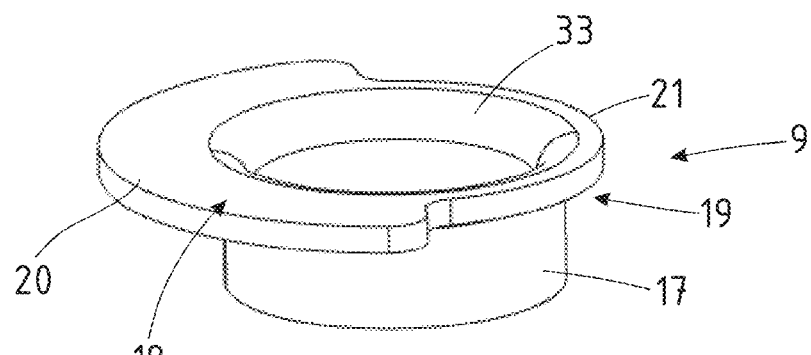
FIG. 6 shows a ball joint socket in a perspective view according to at least one embodiment of the disclosure.
Figure 7:
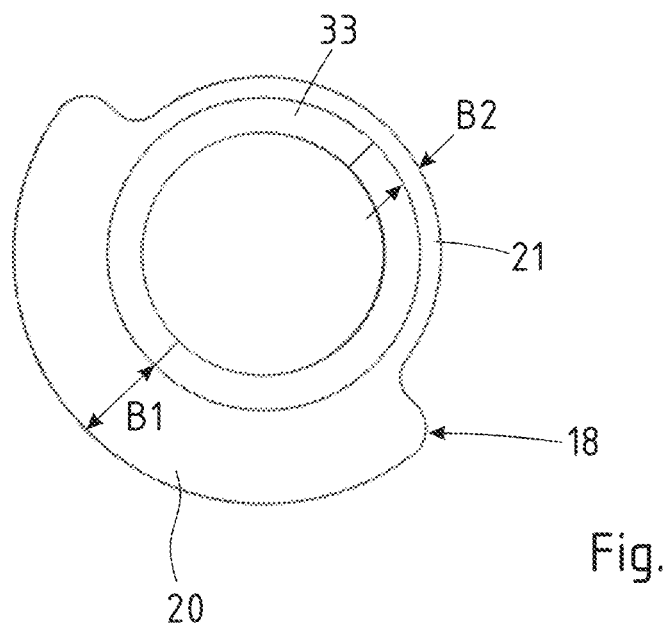
FIG. 7 shows the ball joint socket in a plan view according to at least one embodiment of the disclosure.

The ball joint socket 9 is configured and intended to receive a ball joint 16. FIG. 1, FIG. 2 and FIG. 5 show the ball joint socket 9 with a ball joint 16 integrated therein.

The ball joint socket 9 is joined on the end side of the first length portion 5 to the link end 8 there.

The ball joint socket 9 has a cylindrical portion 17 with an outwardly directed flange 18. The cylindrical portion 17 and the flange 18 are configured from the same material and in one piece. The ball joint socket 9 is a shaped sheet metal part, in the case of which the cylindrical portion 17 is configured as an eyelet. The flange 18 runs in a radially circumferential manner at the upper end 19 of the cylindrical portion 17, directed outward. The flange 18 has two flange portions 20, 21. A first flange portion 20 has a width B1 which is dimensioned to be greater than the width B2 of the second flange portion 21.

The ball joint socket 9 is joined via the flange 18 to a first web 22 of the link body 2. The first web 22 is a constituent part of the upper sheet metal shell 3.

The first web 22 has an upper side 23 and a lower side 24 in relation to the installed position of the chassis link 1 in a motor vehicle. The flange 18 of the ball joint socket 9 bears by way of the flange portion 20 against the lower side 24 of the first web 22 and is joined from above to the first web 22. This takes place in an integrally joined manner by means of a welded seam 25.

A lower second web 26 of the link body 2 is joined to the cylindrical portion 17 of the ball joint socket 9. The lower second web 26 is a constituent part of the lower sheet metal shell 4 of the link body 2. The upper first web 22 and the second lower web 26 are arranged at a vertical spacing a from one another. The lower second web 26 of the link body 2 engages around the cylindrical portion 17 in regions on its outer circumference, and is joined from below to the cylindrical portion 17 in an integrally joined manner by means of a lower welded seam 27. The first web 22 and the second web 26 each have an arcuate joining portion 28, 29. The second web 26 butts with its arcuate joining portion 29 on the circumferential side against the cylindrical portion 17 of the ball joint socket 9, and is joined via the lower welded seam 27 to the cylindrical portion 17. The first web 22 lies with its arcuate joining portion 28 on the flange portion 20 of the flange 18.

The link body 2 is configured as a hollow profile as a result of the shell design of the link body 2, formed from the upper sheet metal shell 3 and the lower sheet metal shell 4. The upper first web 22 is drawn in at the link end 8 of the length portion 5 and tapers over a slanting region 30 in the direction of the ball joint socket 9. The upper sheet metal shell 3 has lateral limbs 31 on its longitudinal edges. The lower sheet metal shell 4 has lateral limbs 32 along its longitudinal edges. The two sheet metal shells 3, 4 are assembled to form the link body 2, and are joined on the edge side along the limbs 31, 32. On one longitudinal edge, the limb 31 of the upper sheet metal shell 3 lies on the inner side of the limb 32 of the lower sheet metal shell 4 and, on the opposite longitudinal edge, the limb 31 of the upper sheet metal shell 3 lies on the outer side of the limb 32 of the lower sheet metal shell 4.

The spacing between the upper sheet metal shell 3 and the lower sheet metal shell 4 is variable. The flange 18 butts from below against the upper sheet metal shell 3 and bears flatly by way of the upper side 23 of the wider flange portion 20 against the lower side 24 of the first web 22. The joining operation by way of welding between the upper first web 22 and the flange 18 or the flange portion 20 of the flange 18 takes place from above. The lower second web 26 of the link body 2 is arranged at a spacing a from the upper first web 22, and is welded to the circumference of the cylindrical portion 17. Here, the second web 26 engages around the cylindrical portion 17 with the joining portion 29.

The upper first welded seam 25 and the lower second welded seam 27 are offset radially with respect to one another in relation to the center axis MA, extending through the cylindrical portion 17, of the ball joint socket 9. The upper welded seam 25 is at a spacing r1 from the center axis MA, which spacing r1 is greater than the spacing r2 of the lower welded seam 27 from the center axis MA.

The cylindrical portion 17 merges via a collar portion 33 which runs in a rounded manner into the flange 18 which is directed outward from the center axis MA.

The foregoing description of some embodiments of the disclosure has been presented for purposes of illustration and description. The description is not intended to be exhaustive or to limit the disclosure to the precise form disclosed, and modifications and variations are possible in light of the above teachings. The specifically described embodiments explain the principles and practical applications to enable one ordinarily skilled in the art to utilize various embodiments and with various modifications as are suited to the particular use contemplated. Various changes, substitutions and alterations can be made hereto without departing from the spirit and scope of the disclosure.

The invention claimed is:

1. A chassis link comprising:
a link body,
a ball joint socket at one link end of the link body, the ball joint socket comprising:
a cylindrical portion, wherein the ball joint sock and the cylindrical portion are integral,
an outwardly directed flange, wherein the flange is joined to a first web of the link body, the flange has two flange portions, a first flange portion having a first width, a second flange portion having a second width, and the first width is different from the second width, wherein a second web of the link body is joined to the cylindrical portion.

2. The chassis link according to claim 1, wherein the flange comprises a circumferential configuration.

3. The chassis link according to claim 1, wherein the link body has a hollow profile in a length portion having the link end.

4. The chassis link according to claim 1, wherein the link body comprises a plurality of sheet metal shells.

5. The chassis link according to claim 1, wherein the link body comprises two sheet metal shells.

6. A chassis link comprising:
a link body,
a ball joint socket at one link end of the link body, the ball joint socket comprising:
a cylindrical portion, wherein the ball joint sock and the cylindrical portion are integral,
an outwardly directed flange, wherein the flange is joined to a first web of the link body, the flange has two flange portions, a first flange portion having a first width, a second flange portion having a second width, and the first width is different from the second width, wherein the first web has an upper side and a lower side, the flange of the ball joint socket bearing against the lower side of the first web and being joined from above to the first web.

7. The chassis link according to claim 6, wherein the flange comprises a circumferential configuration.

8. The chassis link according to claim 6, wherein the link body has a hollow profile in a length portion having the link end.

9. The chassis link according to claim 6, wherein the link body comprises a plurality of sheet metal shells.

10. The chassis link according to claim 6, wherein the link body comprises two sheet metal shells.

11. A chassis link comprising:
a link body,
a ball joint socket at one link end of the link body, the ball joint socket comprising:
   a cylindrical portion, wherein the ball joint sock and the cylindrical portion are integral,
   an outwardly directed flange, wherein the flange is joined to a first web of the link body, the flange has two flange portions, a first flange portion having a first width, a second flange portion having a second width, and the first width is different from the second width, wherein a second web of the link body is joined to the cylindrical portion, and the first web comprises a first arcuate joining portion and the second web comprises a second arcuate joining portion.

12. The chassis link according to claim 11, wherein the flange comprises a circumferential configuration.

13. The chassis link according to claim 11, wherein the link body has a hollow profile in a length portion having the link end.

14. The chassis link according to claim 11, wherein the link body comprises a plurality of sheet metal shells.

15. The chassis link according to claim 11, wherein the link body comprises two sheet metal shells.

* * * * *